United States Patent [19]

Field, II

[11] Patent Number: 4,488,069
[45] Date of Patent: Dec. 11, 1984

[54] STEPPING MOTOR

[75] Inventor: John H. Field, II, Medfield, Mass.

[73] Assignee: Sigma Instruments Inc., Braintree, Mass.

[21] Appl. No.: 522,244

[22] Filed: Aug. 10, 1983

Related U.S. Application Data

[63] Continuation of Ser. No. 251,761, Apr. 7, 1981, abandoned.

[51] Int. Cl.³ .............................................. H02K 37/00
[52] U.S. Cl. .................................. 310/49 A; 310/114; 310/164; 310/165
[58] Field of Search ................... 310/49 A, 49 R, 114, 310/162, 163, 164, 165

[56] References Cited

U.S. PATENT DOCUMENTS

| 3,751,696 | 8/1973 | Morreale | 310/49 R |
| 3,801,844 | 4/1974 | Steele | 310/49 |
| 3,956,650 | 5/1976 | Field | 310/49 R |
| 4,081,703 | 3/1978 | Madsen et al. | 310/49 R |

Primary Examiner—J. D. Miller
Assistant Examiner—Anita M. Ault
Attorney, Agent, or Firm—Toren, McGeady and Stanger

[57] ABSTRACT

In the disclosed motor, a stator and a rotor are movable relative to each other about a common axis. The stator has stator poles with radially directed stator teeth arranged in a circle around the axis and the rotor includes a first axial portion and a second axial portion with a permanent magnet located between them. The first portion has a plurality of rotor teeth extending axially along the periphery of the first portion and the second portion has a substantially cylindrical surface.

9 Claims, 3 Drawing Figures

STEPPING MOTOR

This is a continuation, of application Ser. No. 251,761, filed Apr. 7, 1981, now abandoned.

BACKGROUND OF THE INVENTION

This invention relates to synchronous motors and, particularly, to stepping motors.

Stepping motors and their operation are well known. In an article "New Inductor Motor Has Low Speed, Self-Start and High Torque" by J. H. Staak in the June, 1947 of Electrical Manufacturing, Volume 39, No. 6, published by Gage Publishing Company, the author describes an early stepping motor. In such a motor, a rotor composed of two axially displaced sets of permanently-magnetized radially-extending rotor teeth rotates about an axis common to a stator composed of inwardly extending stator poles, each having stator teeth. One set of rotor teeth is peripherally displaced relative to the other set by one-half tooth pitch. The stator teeth extend axially across both sets off rotor teeth and actuate the rotor by virtue of electrical signals such as pulses applied to windings surrounding the individual stator poles. Typically, in such motors, the two sets of rotor teeth form two soft iron pole shoes on either side of an axially magnetized permanent magnet.

One of the advantages of a stepping motor is its ability to rotate in synchronism with an applied voltage. It is able to "step" or rotate the rotor through a predetermined stepping angle in response to an input voltage or current pulse. In general, the stepping angle, or the angle of a step, through which a rotor responds to a single pulse is determined by the number of rotor teeth, the number of stator poles, and the manner in which the windings are pulsed. Another advantage of a stepping motor is that it is possible to provide for cogging during rotation or for smooth rotation, depending upon the desired application, by selecting a proper tooth pitch relative to the rotor tooth pitch and by proper choice of voltages and currents applied to the windings.

The manner in which pulsing of the windings varies the stepping angle through which the motor rotates the stator is described in U.S. Pat. No. 4,225,696. This patent stows how the rotor may be rotated through full steps, half steps, quarter steps, and eighth steps. A full step corresponds movement of the rotor one-quarter tooth pitch in an eight pole motor.

Stepping motors have a number of disadvantages. To achieve maximum efficiency, the two sets of rotor teeth must be peripherally offset from each other by one-half rotor tooth pitch with as much precision as possible. Aligning the sets to satisfy this requirement complicates the manufacture and assembly of stepping motors. Improper alignment of the sets, and lack of alignment uniformity from rotor to rotor, causes variations in the torque displacement characteristics. This is particularly so during half-stepping or microstepping (stepping at less than one-half step) the rotor. These variations are undesirable where a large number of motors must operate in a large number of applications in response to identical inputs to achieve identical outputs. An example of such use is in floppy disc drives.

Furthermore, stepping motors tend to exhibit resonances. Stepping motors also tend to vibrate.

An object of this invention is to improve stepping motors.

Another object of this invention is to alleviate the aforementioned problems.

SUMMARY OF THE INVENTION

According to a feature of the invention, these objects are attained, in whole or in part, by forming the rotor from a first axial portion and a second axial portion with a permanent magnet located between them, with the first portion having the rotor teeth extending axially along the periphery thereof, and with a second portion having a substantially cylindrical surface.

According to another feature of the invention, the cylindrical surface forms damping means for damping resonances and vibrations.

According to another feature of the invention, the cylindrical portion extends from the gap between the first portion and the second portion to the end face of the second portion.

According to another feature of the invention, the magnet is axially magnetized.

According to another feature of the invention, the motor portions are formed of a plurality of laminations transverse to the axis.

According to yet another feature of the invention, the cylindrical surface has a diameter equal to the outer diameter of the teeth on the first portion.

According to another feature of the invention, the first portion and the second portion of the rotor each form a magnetic reluctance path from the permanent magnet to and from the stator, with each of said paths exhibiting a reluctance, the axial length of the second portion at the periphery having a relationship to the axial length of the first portion at the teeth such that the reluctance of the path through the first portion equals the reluctance of the path through the second portion.

These and other features of the invention are pointed out in the claims. Other objects and advantages of the invention will become evident from the following detailed description when read in light of the accompanying drawings.

DESCRIPTION OF PREFERRED EMBODIMENTS

Figure 1:
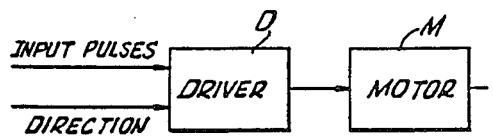
FIG. 1 is a block diagram of a system including a motor which embodies features of the invention.

In FIG. 1, a driver D receives control pulses from an external source (not shown) and drives a motor M. The driver D also receives an external rotation signal which instructs the driver to rotate the motor M in one or the other direction.

Figure 2:
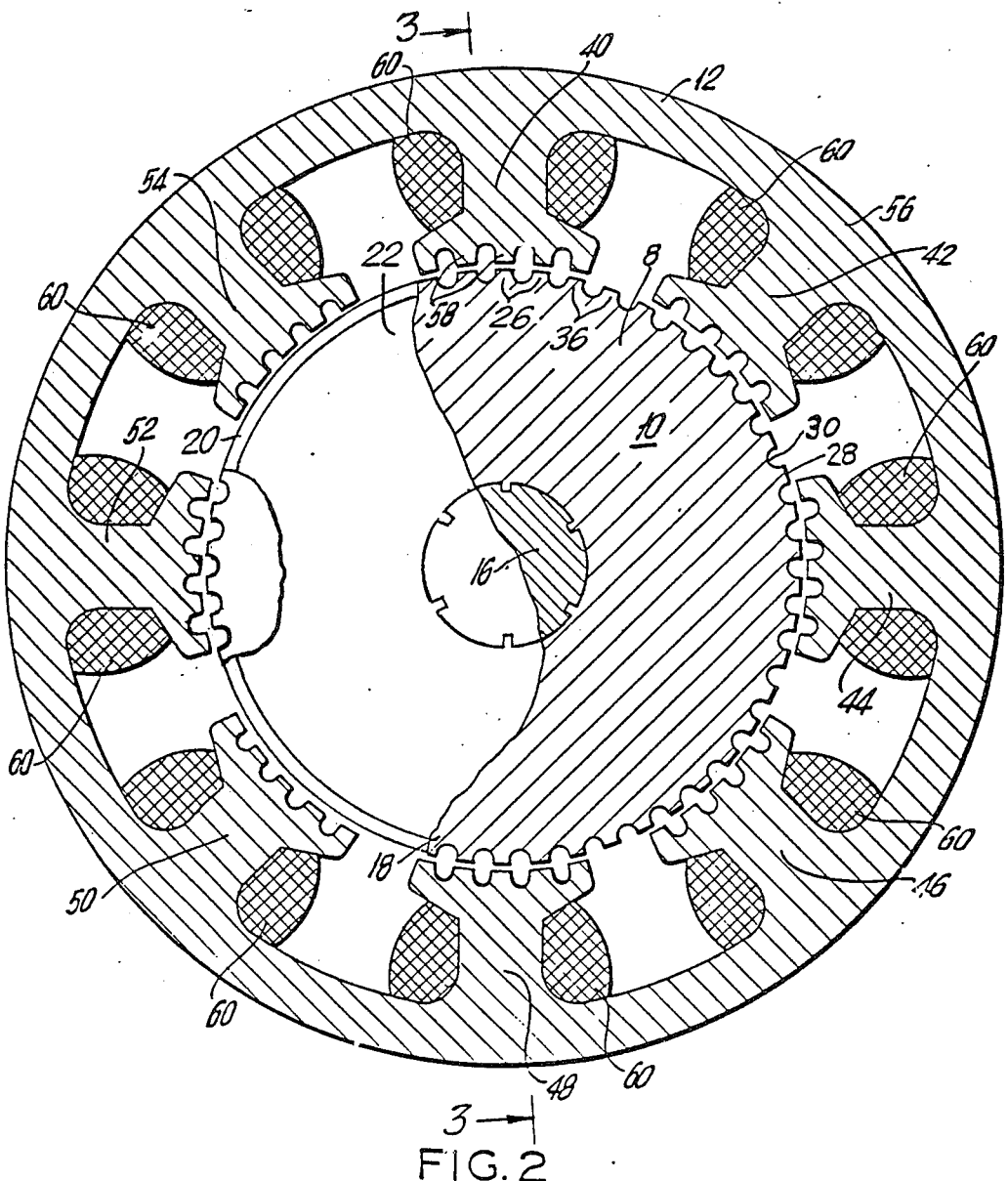
FIG. 2 is a section of the motor in FIG. 1 and specifically a section 2—2 of the motor in FIG. 3.
Figure 3:
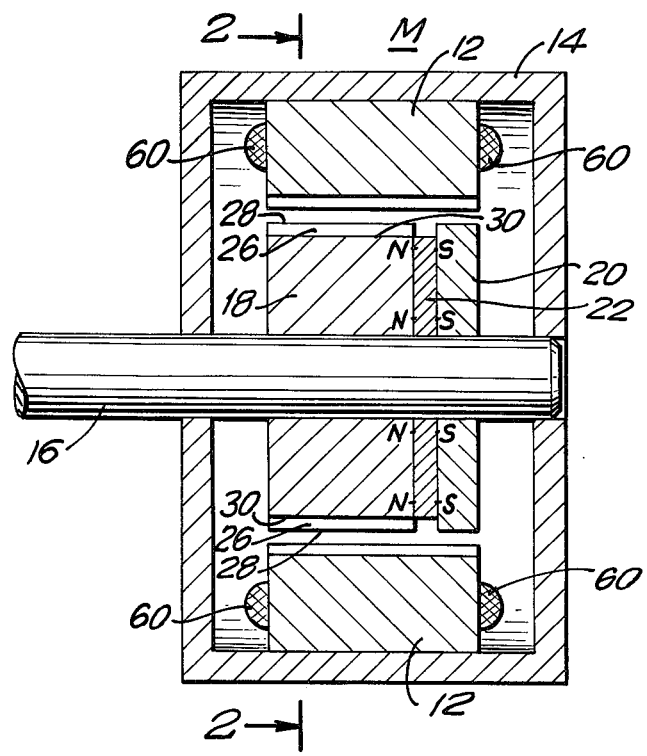
FIG. 3 is a section 3—3 of the motor in FIG. 2.

The motor M appears in more detail in FIGS. 2 and 3. Here, a rotor 10 rotates within a stator 12 mounted within a housing schematically shown in FIG. 3 as 14. A shaft 16 projects through the housing and is keyed to the rotor 10 for rotation therewith. Suitable bearings not shown mount the rotor 10 and the shaft 16 to be rotatable within the housing 14.

As specifically shown in FIG. 3, the rotor 10 is composed of two rotor segments 18 and 20 and a disc-shaped permanent magnet 22 axially magnetized in the direction shown. The segments 18 and 20 are secured to the magnet 22 and to the shaft 16 to rotate together. As more particularly shown in FIG. 2, the rotor segment 18 carries 50 peripherally spaced teeth 26 projecting radially outward. The number of teeth is only an example. Other embodiments of the invention utilize a rotor segment 18 with other numbers of teeth such as 40 or 48. In the example shown, the angular or peripheral tooth pitch, that is, the angular distance between like points on the adjacent rotor teeth 36 is 7.2°. As is readily ascertainable from FIG. 3, the entire segment 18 is magnetized by the permanent magnet 22 to exhibit a north polar magnetization. The segment 20 is magnetized to exhibit a south polar magnetization. Although not shown, the teeth 26 are spaced about the entire periphery of the segment 18. The teeth extend longitudinally along the axial direction of the rotor segment 18.

The rotor segment 20 is disc-shaped and cylindrical at its surface. Its outer diameter is identical with the outer diameter of the segment 18 at the outer edges 28 of the teeth 26. The permanent magnet 22 is equal to the diameter of the segment 18 at roots 30 of the teeth 26.

As shown in FIG. 2, eight angularly displaced poles 40, 42, 44, 46, 48, 50, 52, and 54 project inwardly from a common circumscribing stator portion 56 to form the stator 12. The poles extend longitudinally along the entire axial dimension of the stator 12 from the left face of the segment 18 to the right face of the segment 20 as shown in FIG. 3. Five stator pole teeth or stator teeth 58 form the inner radial ends of each pole 40 to 54. The pole teeth are formed along an imaginary cylindrical surface coaxial with the rotor and spaced slightly from the rotor teeth 26. In the embodiment shown, the pole teeth are pitched 7.2°. thus, they have the same pitch as the rotor teeth 26. According to other embodiments of the invention, the rotor teeth have different pitches. In this embodiment, the rotor tooth pitch and the stator tooth pitch are the same. In others, they are different. The poles 40 to 54 and their respective teeth 58 are angularly arranged so that the teeth on two opposite poles, such as 40 and 48, can directly oppose the rotor teeth on the segment 18 when teeth on the poles 44 and 52, 90° therefrom, are completely out of alignment with the teeth 26 on the segment 18. The teeth 58 on the remaining 45° angularly oriented poles 42, 46, 50, and 54 are angularly arranged so that they are 90° and 270° out of phase with the angular alignment of the rotor teeth 26 in the same position. That is to say, the teeth on adjacent poles are offset from each other by one-quarter tooth pitch and on the perpendicular poles, by one-half tooth pitch.

The pole teeth 58 extend longitudinally parallel to the rotor axis from one end of the segment 18 to the other. Stator coils 60 magnetize the poles 40 to 54 in a sequence that causes rotation of the rotor. Details of the stator coils 60 and their arrangement on the stator are described in my U.S. Pat. No. 4,225,696.

According to one embodiment of the invention, the diameter of the stator is two inches. The diameter of the rotor at the segments 18 and 20 is 1.15 inches. The axial length of the segment 18 is 0.7 inches, the axial thickness of the magnet 22 is 0.125 inches, and the axial thickness of the segment 20 is 0.16 inches. According to one embodiment of the invention, the rotor segment is sintered, the magnet solid, and the segment 20 laminated. According to another embodiment of the invention, the segments 18 and 20 are both laminated while the magnet 22 is solid. According to yet another embodiment of the invention, the segments 18 and 20 as well as the magnet 22 are solid.

In operation, input pulses and direction signals are applied to the driver D which applies pulses to the winding 60 of the motor M. An example of the driver usable with the motor M of the present invention is shown in my U.S. Pat. No. 4,225,696. When a signal tending to produce a south pole at the teeth of the stator poles 42 and 50, and tending to produce a north pole at the stator poles 46 and 54 appears from the driver D, the rotor 10 rotates clockwise. South polar producing signals at the poles 44 and 52, and north polar producing signals at the poles 40 and 48 cause further rotation of the rotor 10 in the clockwise direction. Of course, this recitation of fluxes is only exemplary and more complicated energizing arrangements for the motor M are known from my aforementioned patent.

The flux lines passing from the north polar face of the magnet 22 and through the segment 18 to the stator 12 pass back to the south polar face of the magnet 22 through the segment 20. The dimensions of the segments 18 and 20 in the axial direction are chosen so that the reluctance through the segment 18 and the gap between the teeth 26 and the stator 12 is equal to the reluctance through the segment 20 and the gap between the segment 20 and the stator 12. The effect of the segment 20 is to produce damping which tends to limit resonances and vibrations in the motor M. The segment 20 has a cylindrical surface. This contrasts with prior art constructions which utilized two axially displaced segments with rotor teeth on one segment peripherally displaced relative to the rotor teeth on the other segment by one-half tooth pitch. The cylindrical surface eliminates the need to align rotor teeth. This results in more repeatable performance. Specifically, it helps produce substantially identical torque displacement curves in corresponding motors during half and microstep operation. Such torque displacement curves had varied enormously due to, impart to, different departures from the absolute alignment of the teeth on different segments. The present invention avoids this enormous variation and, therefore, produces repeatable performance from one motor to the next. This makes a motor embodying the invention ideal for floppy disc drives whose performance must be repeatable from motor to motor and from time to time. It produces the required sameness of operation, and rapid damping which is also reliable. The use of but a single set of teeth also makes the motor less complicated, and hence, easier to manufacture. Also, the rotor may be in the form of a more elongated cylinder with the segments 18 and 20 in the form of cup-shaped pole shoes as shown in that patent, but with one cup smaller than the other, and the smaller cup having the cylindrical periphery.

While embodiments of the invention have been described in detail, it will be evident to those skilled in the art that the invention may be otherwise embodied. For example, thr rotor can be re-duplicated with a single stator in a single housing comparable to the motor in my aforementioned patent so as to form a so-called double motor.

According to another embodiment of the invention, the diameter of the segment 20 is equal to the diameter of the segment 18 extending between the roots 30.

According to yet another embodiment of the invention, the diameter of the segment 20 is equal to the diameter of the segment 18 halfway between the roots 30 of the outer edges 28.

According to an embodiment of the invention, the reluctances along one of the paths through the segment 18 to the stator and through the segment 20 to the stator are within ±5% of each other.

According to a less preferred embodiment of the invention, the reluctances are within 30% of each other. It is, of course, possible to use structures whose reluctances have even wider divergences. However, their effects are not as desirable as for the more preferred embodiments.

What is claimed is:

1. A synchronous motor comprising:
   a stator and a rotor movable relative to each other about a common axis;
   said stator having a plurality of stator poles;
   said poles having a plurality of radially directed stator teeth arranged in a circle around the axis;
   said rotor having a plurality of rotor teeth arranged about the axis;
   a permanent magnet for continuously magnetizing said rotor and producing magnetic fields in the rotor;
   winding means on said poles for inducing magnetic fields in said poles in radial directions so as to interact with magnetic fields in the rotor and rotate the rotor;
   said rotor hvaing a first axial portion and a second axial portion with said permanent magnet located between them and axially magnetizing said portions with opposite polarities;
   said first portion having said plurality of rotor teeth extending axially along the entire periphery of the first portion all magnetized with one polarity of the magnet;
   said second portion having a substantially toothless cylindrical surface extending along substantially the entire axial length of the second portion and being entirely magnetized with the opposite polarity of the magent.

2. A motor as in claim 1, wherein said second portion includes damping means for damping movements of said rotor, said cylindrical surface forming said damping means.

3. A motor as in claim 2, wherein said rotor extends from one end face at the first portion to a second end face at the second portion and a distance separates said second portion from said first portion, said second portion having the cylindrical periphery from the gap to said second end face.

4. A motor as in claim 1, wherein said rotor extends from one end face at the first portion to a second end face at the second portion and a gap separates said second portion from said first portion, said second portion having the cylindrical periphery from the gap to said second end face.

5. A motor as in claim 1, wherein said rotor portions are formed of a plurality of laminations transverse to the axis.

6. A motor as in any one of claims 2 to 5, wherein said rotor teeth form outer edges in the radial direction, the outer edges of the teeth defining an outer diameter, said cylindrical surface having a diameter equal to the outer diameter.

7. A motor as in claim 1, wherein said rotor teeth form outer edges in the radial direction, the outer edges of the teeth defining an outer diameter, said cylindrical surface having a diameter equal to the outer diameter.

8. A motor as in any one of claims 2 to 7, wherein said first portion and said second portion of the rotor each form a magnetic reluctance path from the permanent magnet toward said stator, each of said paths exhibiting a reluctance, the axial length of said second portion at the periphery having a relationship to the axial length of the first portion at the teeth such that the reluctance of the path through the first portion equals the reluctance of the path through the second portion.

9. A motor as in claim 1, wherein said first portion and said second portion of the rotor each form a magnetic reluctance path from the permanent magnet toward said stator, each of said paths exhibiting a reluctance, the axial length of said second portion at the periphery having a relationship to the axial length of the first portion at the teeth such that the reluctance of the path through the first portion equals the reluctance of the path through the second portion.

* * * * *